(12) United States Patent  
Fay, II et al.

(10) Patent No.: US 12,514,144 B2  
(45) Date of Patent: Jan. 6, 2026

(54) LATCH MECHANISM FOR LATERAL TRANSPORT CENTER-PIVOT MOWER

(71) Applicant: CNH Industrial America LLC, New Holland, PA (US)

(72) Inventors: Jeffrey Fay, II, Oxford, PA (US); Jordan Milewski, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 433 days.

(21) Appl. No.: 18/199,435

(22) Filed: May 19, 2023

(65) Prior Publication Data

US 2024/0381805 A1 Nov. 21, 2024

(51) Int. Cl.
*A01B 73/00* (2006.01)
*A01D 34/00* (2006.01)
*A01D 67/00* (2006.01)
*A01D 34/66* (2006.01)

(52) U.S. Cl.
CPC .......... *A01B 73/005* (2013.01); *A01D 34/001* (2013.01); *A01D 67/005* (2013.01); *A01D 34/664* (2013.01)

(58) Field of Classification Search
CPC ......... E05C 3/045; E05C 3/30; A01B 59/006; A01B 73/06; A01B 73/005; A01B 63/045; A01B 63/102; A01D 75/004; A01D 75/002; A01D 34/001; A01D 34/664; A01D 67/005; A01D 78/1014; A01D 78/1007; A01D 78/1021; A01D 41/144; A01D 41/148
See application file for complete search history.

(56) References Cited

U.S. PATENT DOCUMENTS

| | | | | |
|---|---|---|---|---|
| 3,814,191 A * | 6/1974 | Tilbury | ................ | A01B 73/044 172/583 |
| 5,642,607 A * | 7/1997 | Stephenson | .......... | A01B 73/005 56/192 |
| 5,806,291 A * | 9/1998 | Lehman | ............... | A01D 34/667 56/6 |
| 6,076,613 A * | 6/2000 | Frasier | ................. | A01B 73/065 172/776 |
| 6,360,516 B1* | 3/2002 | Harkcom | ............. | A01D 67/005 56/15.5 |
| 7,100,350 B2* | 9/2006 | Breneur | ............. | A01D 78/1007 172/683 |

(Continued)

*Primary Examiner* — Adam J Behrens
(74) *Attorney, Agent, or Firm* — Buchanan Ingersoll & Rooney PC

(57) ABSTRACT

An agricultural machine includes a trail frame, a wheel arm, a field wheel, a tongue, and a latch mechanism for releasably securing the trail frame to the tongue. The latch mechanism includes a catch mounted on the trail frame for pivoting about a fulcrum, a receiver on the tongue, the catch engageable with the receiver, a spring acting between the catch and trail frame on a first side of the fulcrum for biasing the catch into engagement with the receiver, and a rigid link acting between the wheel arm and the catch on a second side of the fulcrum. Pivoting motion of the wheel arm moving the field wheel away from the trail frame causes movement of the rigid link, and, once a pre-defined lost motion is overcome, continued movement of the rigid link causes pivoting of the catch about the fulcrum and disengagement of the catch from the receiver.

15 Claims, 8 Drawing Sheets

(56) References Cited

U.S. PATENT DOCUMENTS

| | | | |
|---|---|---|---|
| 7,712,544 B1* | 5/2010 | Misenhelder | A01B 73/065 |
| | | | 172/311 |
| 8,336,639 B2 | 12/2012 | Palen | |
| 9,603,306 B2* | 3/2017 | Fay, II | A01B 73/005 |
| 9,883,623 B2* | 2/2018 | Koch | A01B 63/145 |
| 10,051,775 B2* | 8/2018 | Sudbrink | A01B 73/06 |
| 10,143,138 B2 | 12/2018 | Fay, II et al. | |
| 10,194,583 B2 | 2/2019 | Rude et al. | |
| 11,343,953 B2* | 5/2022 | Fay, II | A01B 73/06 |
| 11,490,564 B2 | 11/2022 | LaVally et al. | |
| 2010/0307780 A1* | 12/2010 | Hulicsko | A01B 73/067 |
| | | | 172/396 |
| 2015/0135673 A1* | 5/2015 | Rude | A01D 75/00 |
| | | | 56/15.5 |
| 2016/0007534 A1* | 1/2016 | Fay, II | A01D 75/004 |
| | | | 56/228 |

* cited by examiner

LATCH MECHANISM FOR LATERAL TRANSPORT CENTER-PIVOT MOWER

TECHNICAL FIELD

The subject disclosure relates to a latch mechanism for a lateral transport center-pivot mower.

BACKGROUND

As is described in U.S. Pat. No. 11,343,953 to CNH Industrial America LLC, which is incorporated by reference in its entirety and for all purposes, agricultural machines, such as towed mowers, are designed to be configured for towing at relatively high speeds over roads to transport the mower between fields. Such machines are also designed to be configured for operation, towed at lower speeds to mow crops in the field. It is convenient to pivot the mower's header (which houses the crop cutting blades) into a substantially parallel orientation with respect to the tongue (which attaches the mower to the tractor) during transport. It is important to reliably secure the header to the tongue during transport so that it does not pivot into an orientation transverse to the tongue and thereby place stress on the mower structure for which it was not designed. This orientation may also cause the tractor or other towing vehicle to become unstable. It is further desirable to be able to release the header from the tongue so that the mower can be readily converted to its operational configuration. It is further desirable to either limit or prevent the latch from releasing the header from the tongue in the event that the raised field wheels inadvertently sag or lower during transport.

SUMMARY OF THE INVENTION

According to an aspect of the invention, an agricultural machine includes a trail frame, a wheel arm pivotably attached to said trail frame, a field wheel mounted on said wheel arm, a tongue pivotably mounted on said trail frame, and a latch mechanism for releasably securing said trail frame to said tongue. The latch mechanism includes a catch mounted on said trail frame for pivoting motion about a fulcrum, a receiver mounted on said tongue, the catch being engageable with said receiver, a spring acting between said catch and said trail frame on a first side of said fulcrum for biasing said catch into engagement with said receiver; and a rigid link acting between said wheel arm and said catch on a second side of said fulcrum opposite to said first side. Pivoting motion of said wheel arm moving said field wheel away from said trail frame causes movement of said rigid link, and, once a pre-defined lost travel motion is overcome, continued movement of said rigid link causes pivoting of said catch about said fulcrum and disengagement of said catch from said receiver.

BRIEF DESCRIPTION OF THE DRAWINGS

Corresponding reference characters indicate corresponding parts throughout the several views. The exemplification set out herein illustrates an embodiment of the subject disclosure, and such exemplification is not to be construed as limiting the scope of the subject disclosure in any manner.

DETAILED DESCRIPTION OF THE INVENTION

Figure 1:
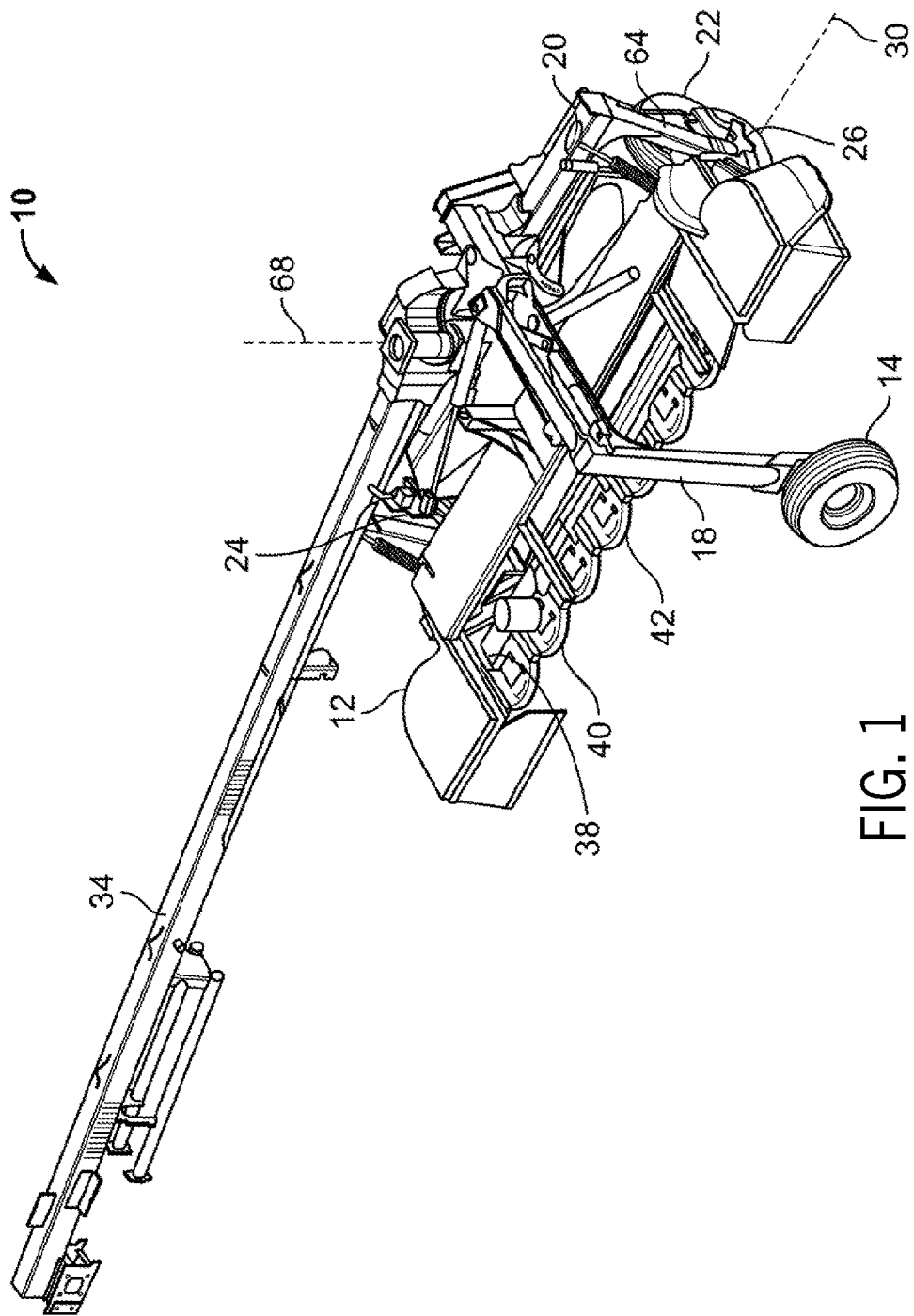
FIG. 1 is an isometric view of an agricultural machine, in this example a towed mower, shown configured for transport.
Figure 2:
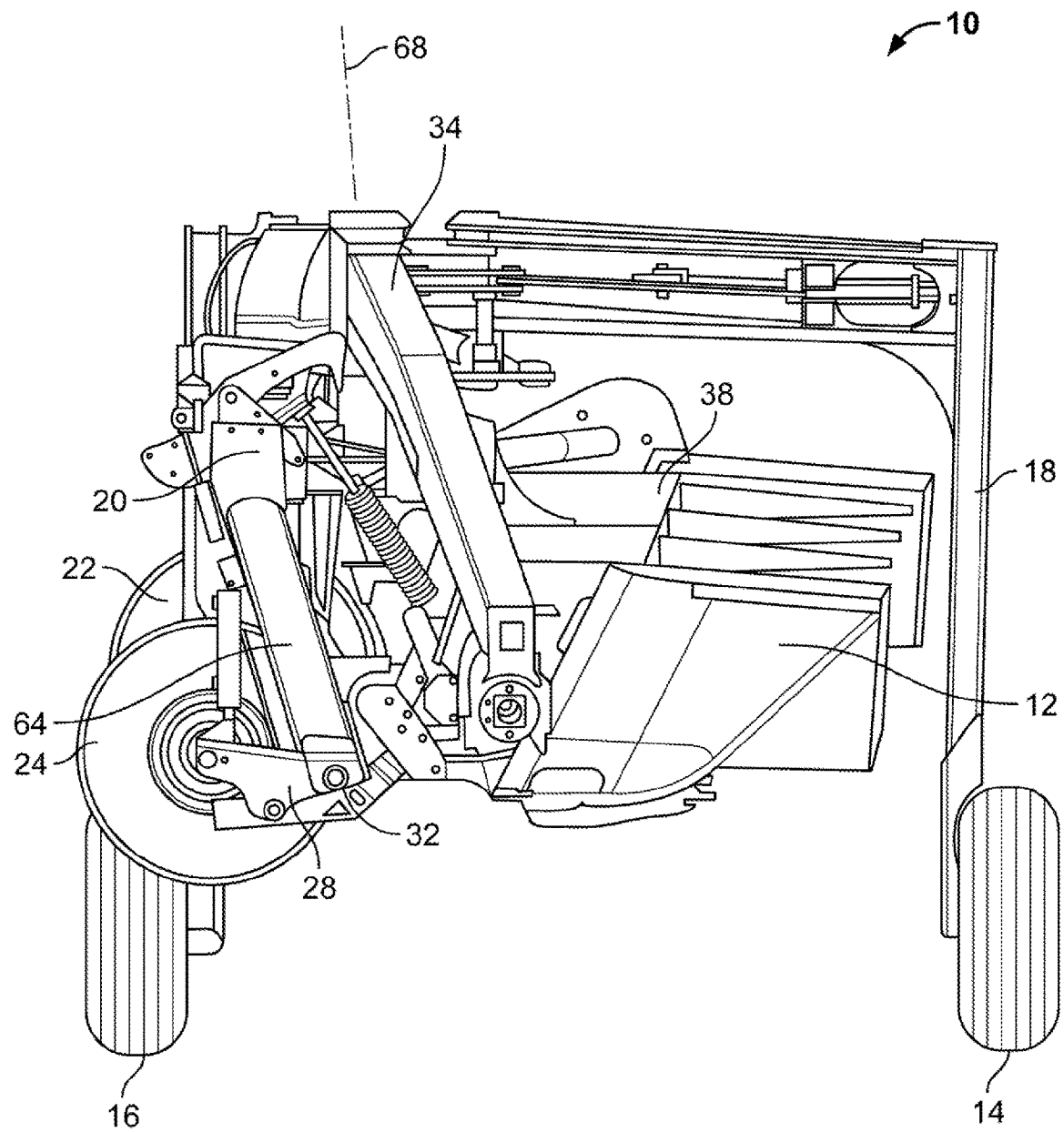
FIG. 2 is a front view of the mower shown in FIG. 1.
Figure 3:
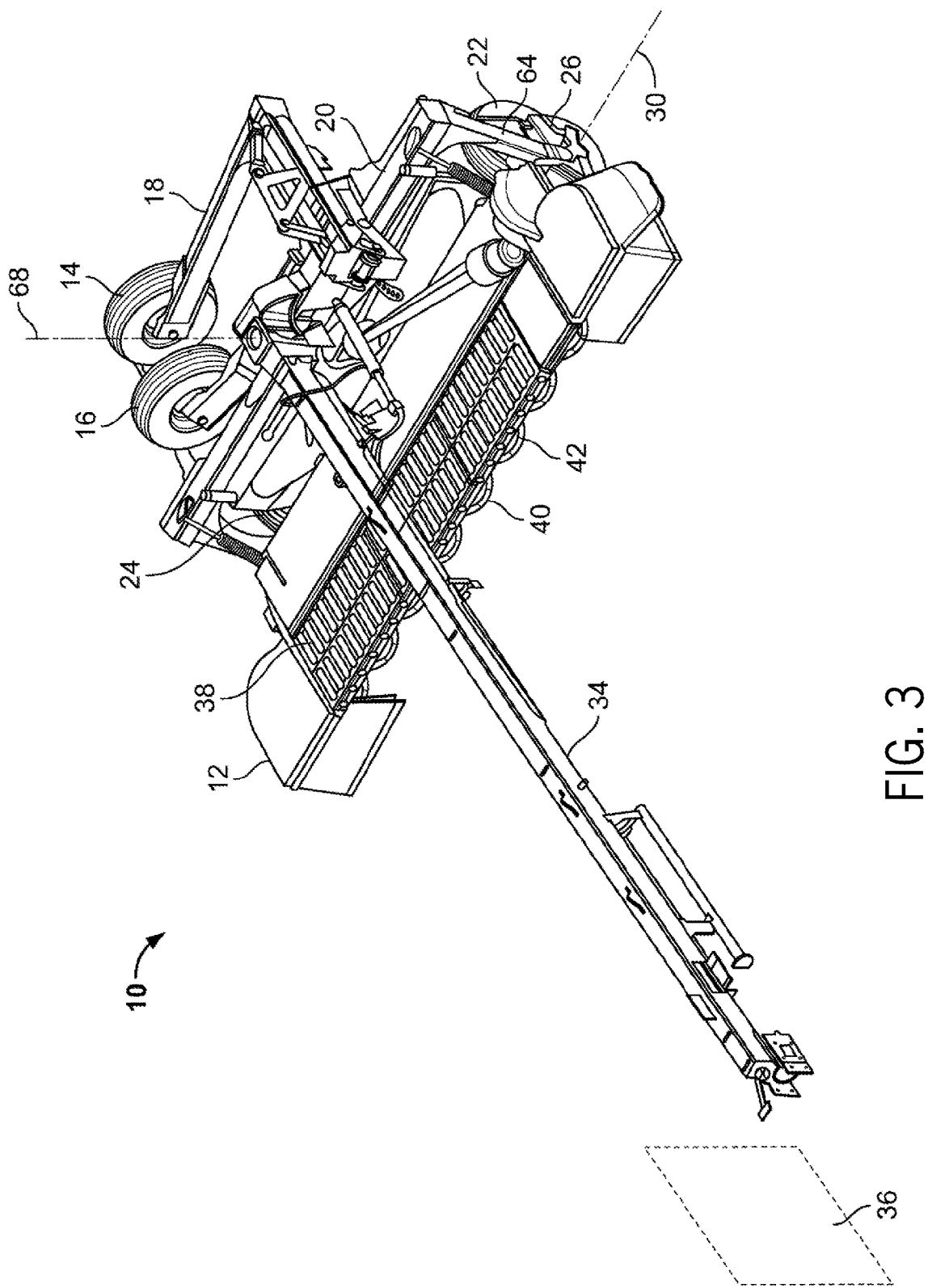
FIG. 3 is an isometric view of the mower of FIG. 1 shown configured for mowing.

FIGS. 1-3 show an agricultural machine 10, in this example a mower 12. A detailed description of an exemplary mower is found in U.S. Pat. Nos. 10,143,138 and 11,343,953, which are hereby incorporated by reference herein. FIGS. 1 and 2 show the mower 12 in its transport configuration, supported on road wheels 14 and 16 as it would appear when towed over roadways between fields. Road wheels 14 and 16 are mounted on a road frame 18 which is attached to a trail frame 20. FIG. 3 shows the mower 12 in its field configuration, supported on field wheels 22 and 24, as it would appear when towed behind a tractor during mowing.

As shown in FIGS. 2 and 3, field wheels 22 and 24 are rotatably mounted on the trail frame 20 via respective wheel arms 26 and 28. Wheel arms 26 and 28 pivot about respective axes 30 and 32 and are movable between a deployed configuration for mowing, shown in FIG. 3, and a stowed configuration for transport, shown in FIGS. 1 and 2. A tongue 34 is pivotably attached to the trail frame 20, the tongue being attachable to a tractor 36 (shown schematically in FIGS. 1 and 3) for towing. In this example of mower 12, a header 38 is mounted on trail frame 20, the header having a plurality of rotating discs 40 comprising crop cutting blades 42.

Figure 4:
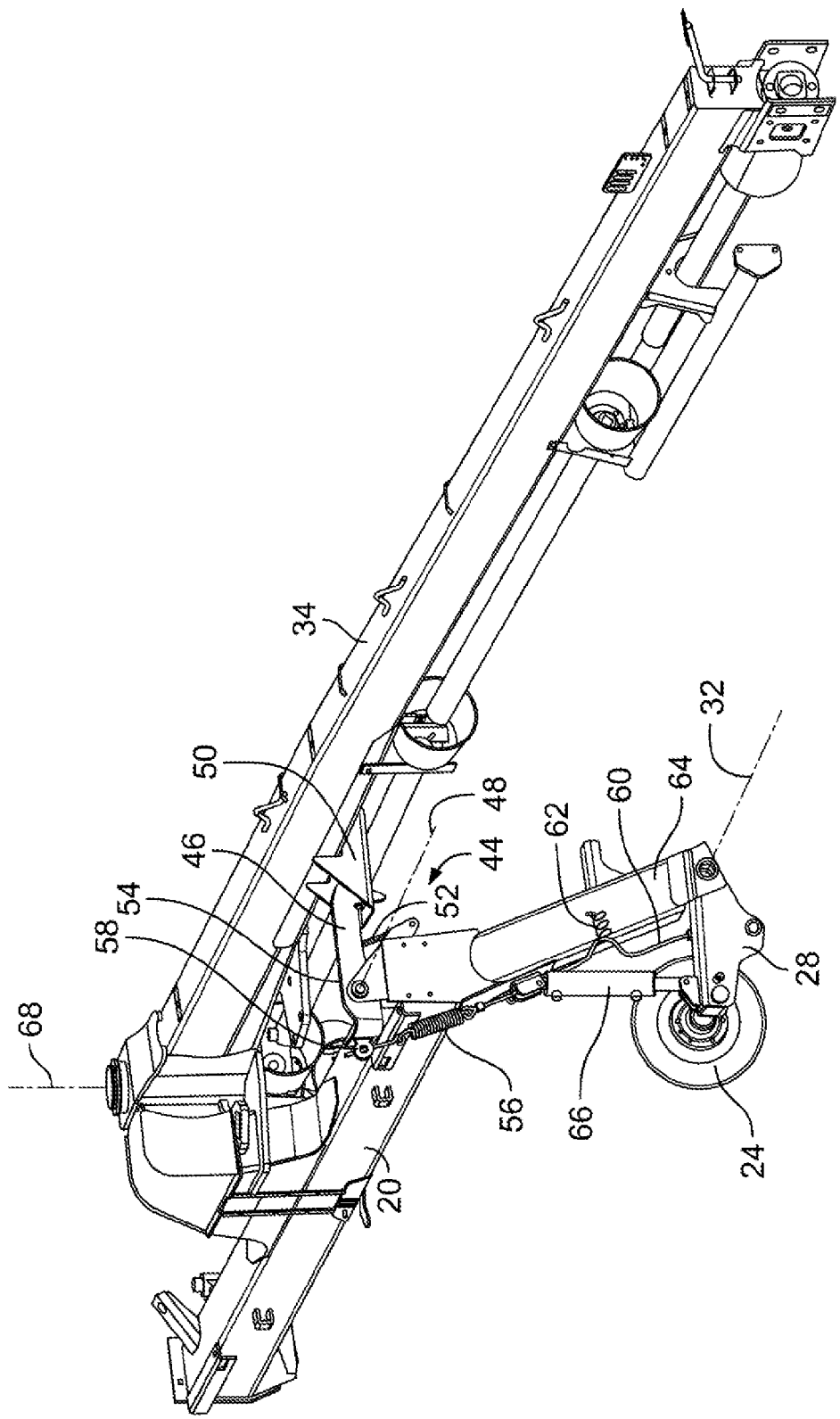
FIGS. 4, 5 and 6 are isometric views of a portion of the mower showing an example latching mechanism according to the invention in operation.

As shown in FIG. 4, a latch mechanism 44 is mounted on the trail frame 20 and the tongue 34. Latch mechanism 44 releasably secures the trail frame 20 to the tongue 34 during transport (FIG. 1), and releases the trail frame 20 from the tongue 34 so that the mower 12 may be configured in its field configuration (FIG. 3) for mowing. According to this example, latch mechanism 44 comprises a catch 46 mounted on the trail frame 20. Catch 46 is pivotable about a fulcrum axis 48 so that it may engage and disengage with a receiver 50 fixedly mounted on the tongue 34. Latch mechanism 44 includes a first spring 52 that acts between the catch 46 and the trail frame 20. First spring 52 is attached to catch 46 on a first side 54 of the fulcrum axis 48 so as to bias the catch 46 into latching engagement with the receiver 50 and maintain the trail frame 20 secured to the tongue 34.

Latch mechanism 44 also includes a second spring 56 that is attached to the catch 46 on a second side 58 of the fulcrum axis 48. The second spring 56 acts between the catch 46 and the wheel arm 28. In this example, the connection between the spring 56 and the wheel arm 28 is effected via a cable 60 extending between the wheel arm 28 and the free end of the second spring 56. Any slack in cable 60 is conveniently taken up by a third spring 62, which acts between the cable 60 and a leg 64 of the trail frame 20 on which the wheel arm 28 is mounted. In summary, the catch 46 is biased in the latching direction by first spring 52, and is biased in the unlatching direction by the combination of second spring 56, cable and third spring 62.

Pivoting motion of the wheel arm 28 which moves the field wheel 24 between its stowed configuration for transport (FIG. 4) and its deployed configuration for mowing (FIG. 6) is effected in this example by an actuator 66. Actuator 66 acts between the trail frame 20 and the wheel arm 28. A similar actuator is also used to deploy and stow field wheel 22 (not shown). Actuator 66, in this example, is a hydraulic actuator but may alternately comprise one of any number of different types of actuators including pneumatic actuators, mechanical actuators and electro-mechanical actuators to cite some examples.

Figure 5:
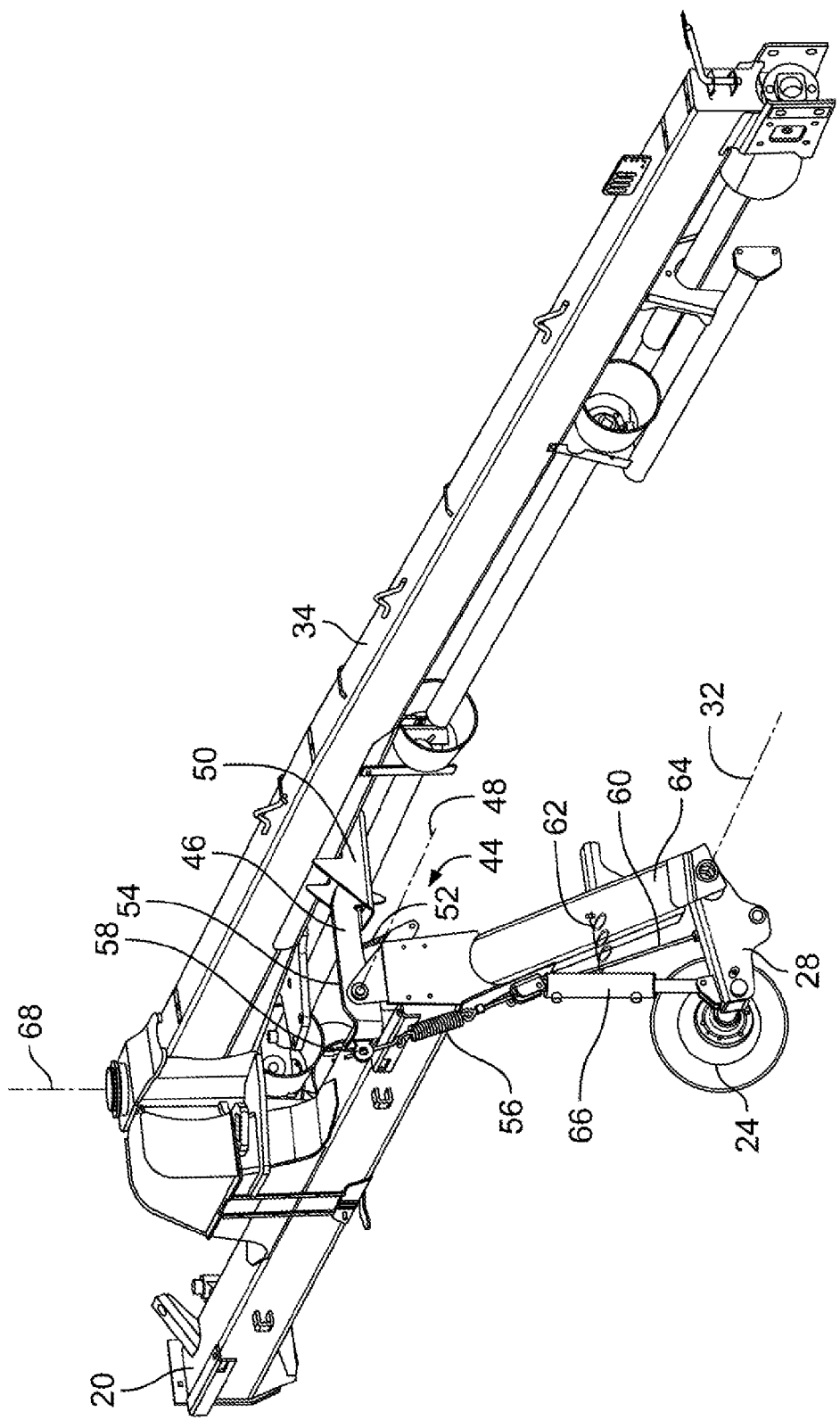
Figure 6:
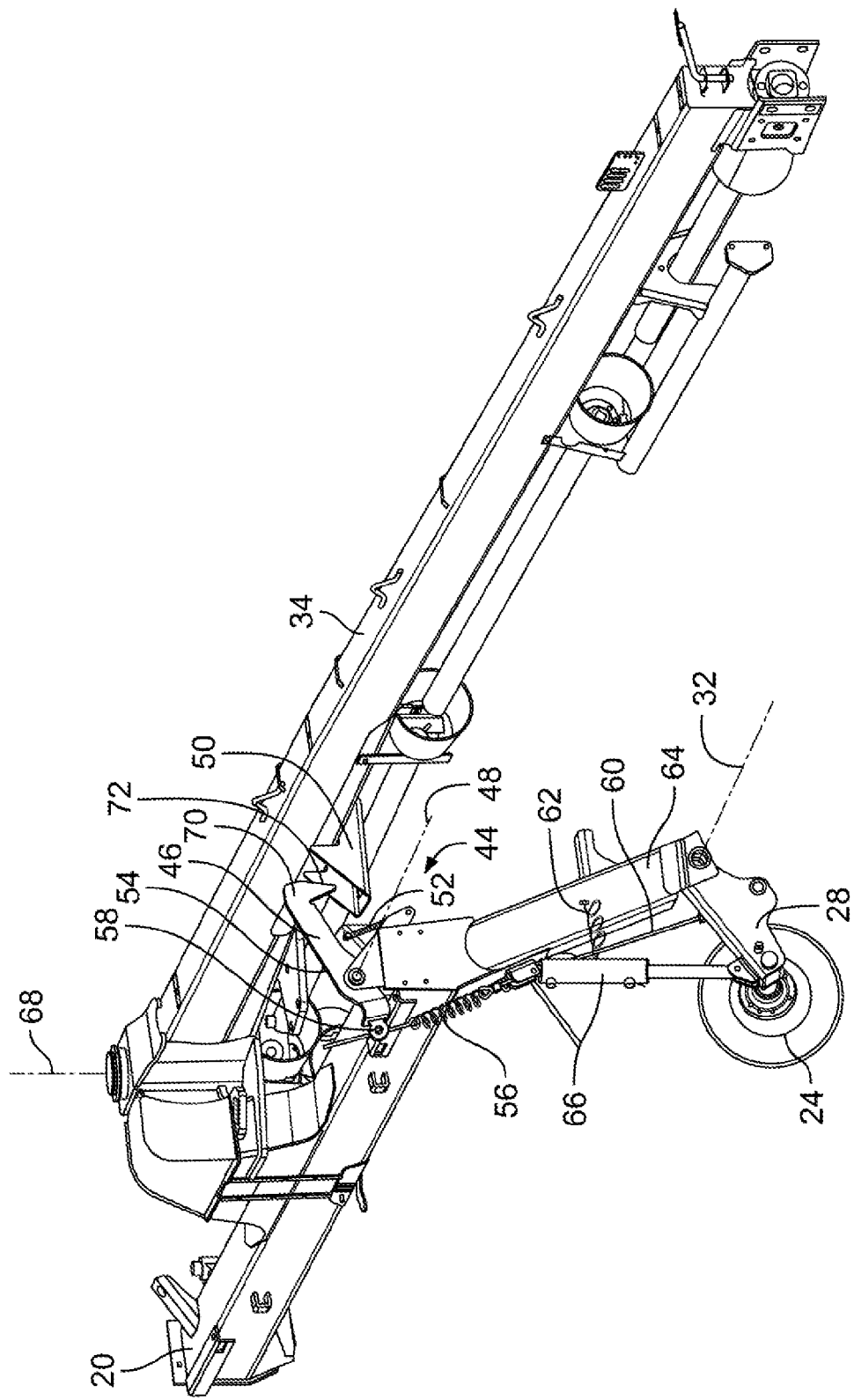

Operation of the latch mechanism 44 releasing the trail frame 20 from the tongue 34 when switching the mower 12 from transport to field configuration is illustrated in FIGS. 4-6. As shown in FIG. 4, the mower 12 is in its transport configuration with the field wheel 24 drawn upwardly toward the trail frame 20 by the pivoting action of wheel arm 28 effected by the actuator 66. The second spring 56 is not in tension, there being slack in cable 60, the slack cable being secured to the leg 64 by the third spring 62. First spring 52 is in tension and thereby holds the catch 46 in engagement with the receiver 50 to secure the trail frame 20 to tongue 34.

As shown in FIG. 5, to deploy the field wheel 24, the actuator 66 pivots the wheel arm 28 about its pivot axis 32, initially taking the slack out of cable 60. FIG. 5 shows the actuator 66 at 50% of its full range of motion, and it is considered advantageous that all of the slack be out of cable 60 at this point in the actuator's motion. Further motion of the actuator 66 pivots wheel arm 28 which, acting through cable 60, puts the second spring 56 in tension.

FIG. 6 shows the actuator at full stroke to deploy the field wheel 24. The second spring 56 acts on the second side 58 of the fulcrum axis 48 of the catch 46. Because the second spring 56 is stiffer than the first spring 52 (i.e., the spring constant of the second spring 56 is greater than the spring constant of the first spring 52) acting on the first side 54 of the fulcrum axis 48, the force applied to the catch 46 by the second spring 56 overcomes the force applied to the catch by the first spring 52 and the catch 46 pivots about the fulcrum axis 48 and disengages (i.e., unlatches) from the receiver 50, thereby releasing the trail frame 20 from the tongue 34. At this point the road wheels 14 and 16 may be moved from their transport configuration (see FIGS. 1 and 2) and the tongue 34 may be pivoted relatively to the trail frame 20 about pivot axis 68 to place the mower 12 in its field configuration (FIG. 3) ready for mowing.

To reconfigure mower 12 for transport, the tongue 34 is pivoted toward the trail frame 20 about its pivot axis 68 and the road wheels 14 and 16 are deployed so that they support the mower 12. Actuators 66 raise the field wheels 22 and 24. Slack is placed in cable 60 as the wheel arm 28 pivots about its pivot axis 32, thereby relieving tension on the second spring 56 and allowing the catch 46 to pivot about its fulcrum axis 48 under the tension of the first spring 52. Once the actuator 66 is fully retracted, the catch 46 is in position to again engage the receiver 50 and secure the trail frame 20 to the tongue 34 for transport. Engagement between the catch 46 and receiver 50 may be effected by positioning the receiver 50 beneath the catch 46 as the catch pivots, or by forcing the receiver against the catch and allowing it to rise and snap into engagement. As shown in FIG. 6 the catch 46 comprises a hook 70 with an outwardly facing ramp surface 72 which allows the catch to pivot when the receiver 50 is pressed against it. Being spring biased, the catch 46 pivots as necessary but engages securely with the receiver 50 once the hook 70 is captured.

Figure 7:
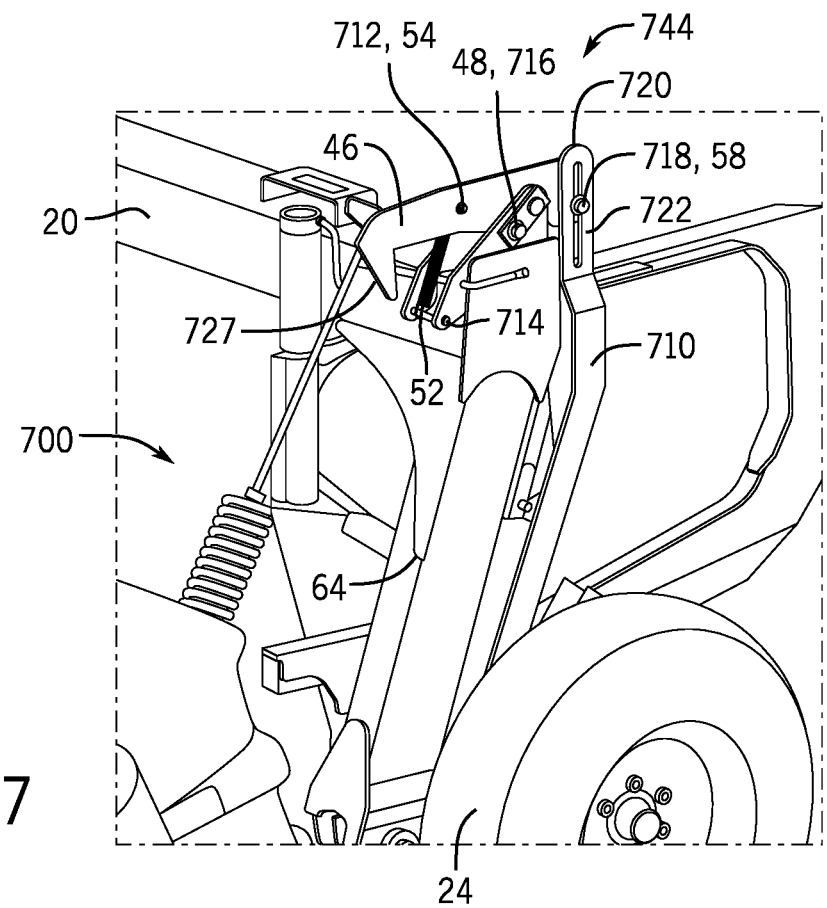
FIG. 7 depicts an isometric view of a segment of an alternative trail frame including a slotted link arrangement for controlling operation of the catch, wherein the catch is shown in a latched state (receiver of tongue not shown)
Figure 8:
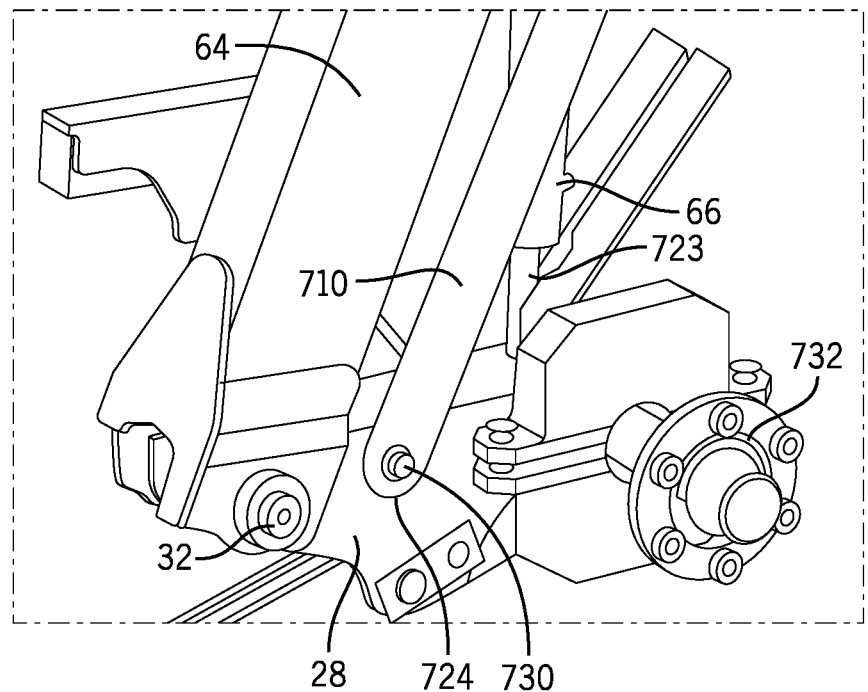
FIG. 8 depicts an isometric view of the alternative trail frame segment of FIG. 7 with the field wheel omitted to review the lower portion of the slotted link.
Figure 9:
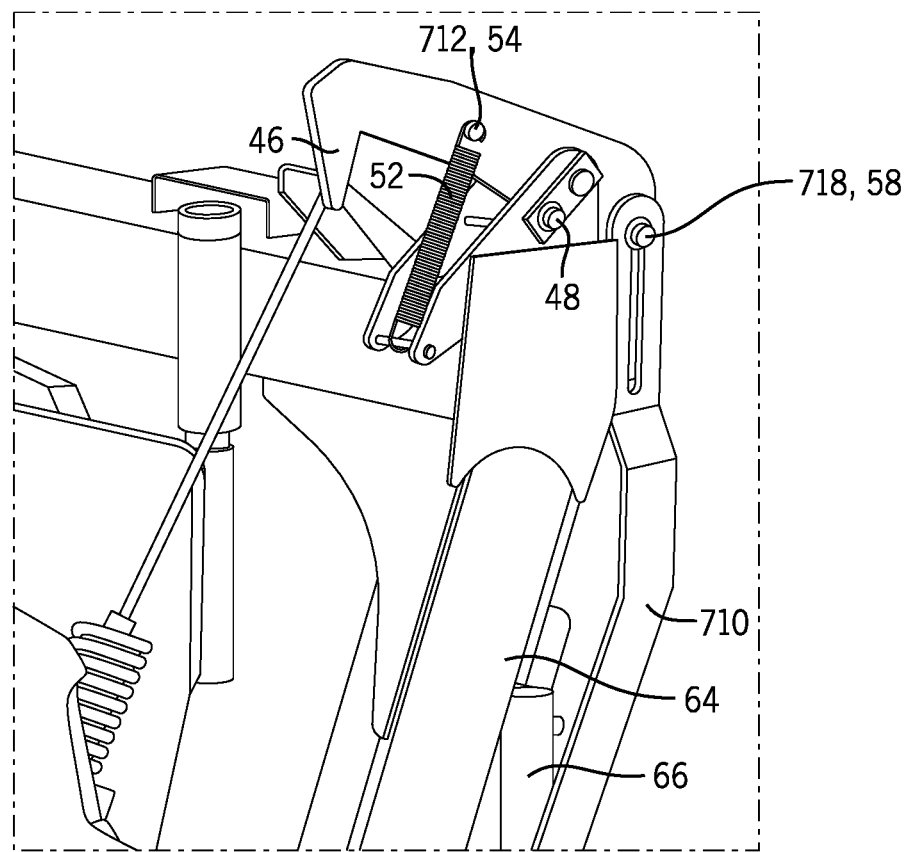
FIG. 9 depicts an isometric view of the alternative trail frame segment of FIG. 7, wherein the catch is shown in an unlatched state.

Turning now to FIGS. 7-9, those figures depict a different example of a latch mechanism 744 for use with a mower 700. The mower 700 is substantially identical to mower 10, and only the differences therebetween will be described hereinafter. It should be understood that the components of mower 10 may be incorporated into mower 700.

The mower 700 includes a different latch mechanism 744 for retaining the tongue 34 in a transport position. The latch mechanism 744 is substantially similar to latch mechanism 44, and the primary differences between those latch mechanisms will be described hereinafter.

As noted above, the catch 46 of latch mechanism 44 is biased in the latching direction by first spring 52, and is biased in the unlatching direction by the combination of second spring 56, cable and third spring 62. However, in the latch mechanism 744, a rigid link 710 replaces the combination of second spring 56, cable 60 and third spring 62.

Catch 46 has a unitary body defining a hook at it distal end for engaging receiver 50. One end of the first spring 52 is mounted to a pin or fastener 712 that is fixed to catch 46. Fastener 712 is mounted to catch 46 at the first side 54 of fulcrum axis 48. The other side of the first spring 52 is mounted to a stationary bracket 714 that is fixed to trail frame 20. The catch 46 is also pivotably mounted to bracket 714 by a pin or fastener 716. Fastener 716 defines the fulcrum axis 48 about which catch 46 pivots. Another pin or fastener 718 is mounted to catch 46 at the second side 58 of fulcrum axis 48. As will be described hereinafter, link 710 interacts with fastener 718 of catch 46 to control pivoting motion of catch 46.

Link 710 has an elongated body extending between a top end 720 and a bottom end 724. Link 710 may be formed, for example, from bent sheet metal or plastic. An elongated slot 722 is formed at the top end 720 of link 710. The fastener 718 of catch 46 is slideably positioned within the slot 722, the significance of which will be described later. The bottom end 724 of link 710 is mounted (either pivotably or fixedly) to wheel arm 28 by a pin or fastener 730. Actuator 66 is also mounted, either directly or indirectly, to wheel arm 28 for rotating wheel arm 28, wheel axle 732 and field wheel 24 about axis 32.

As noted above, actuator 66 pivots wheel 24 about axis 32 between deployed and retracted (stowed) positions. In the fully retracted position shown in FIG. 7, wheel 24 is stowed for transport. And, in the fully deployed position, wheel 24 contacts the ground and the header 38 is fully raised off the ground.

In operation, to move the wheel 24 from the stowed position of the transport configuration (FIG. 1) to the deployed position of the field configuration (FIG. 3), the actuator 66 is deployed, which causes a piston 723 of actuator 66 to extend, which causes the wheel arm 28 to rotate about axis 32 in the clockwise direction (as viewed in FIG. 8) due to the interconnection between piston 723 and the top side of wheel arm 28. Clockwise rotation of the wheel arm 28 causes the link 710 to move downwardly due to the interconnection between link 710 and wheel arm 28. As the link 710 shifts downwardly, the top end of slot 722 eventually comes to bear on fastener 718 after a lost travel is overcome, which causes rotation of catch 46 in the clockwise direction (as viewed in FIG. 9) about fulcrum axis 48 against the bias of spring 52. The hook on catch 46 releases from receiver 50 (not shown in FIGS. 7-9), and the tongue 34 may be rotated about axis 68 from the transport configuration (FIG. 1) to the field configuration (FIG. 3).

To move the wheel 24 from the deployed position of the field configuration (FIG. 3) to the stowed position of the transport configuration (FIG. 1), the piston 723 of actuator 66 is retracted, which causes the wheel arm 28 to rotate about axis 32 in the counterclockwise direction (as viewed in FIG. 8). Rotation of the wheel arm 28 causes the link 710 to move upwardly. As the link 710 shifts upwardly, the slot 722 also moves upwardly, permitting rotation of catch 46 in the counterclockwise direction (as viewed in FIG. 9) about fulcrum axis 48 under the bias of spring 52. If tongue 34 is already positioned in the transport configuration (FIG. 1), the hook on catch 46 moves to the position shown in FIG. 7 and engages receiver 50 of tongue 34, thereby locking the tongue 34 in transport configuration (FIG. 1). Once link 710 reaches its transport configuration, fastener 718 is positioned about midways between the opposing ends of slot 722.

Alternatively, if tongue 34 is not (yet) in the transport configuration, catch 46 still moves to the position shown in FIG. 7, however, catch 46 cannot (yet) engage with receiver 50. Moving tongue 34 to the transport configuration (FIG. 1) causes receiver 50 to contact the sloped end 727 of the catch 46 of FIG. 7, which causes catch 46 to initially rotate in the clockwise direction (as viewed in FIG. 7) against the bias of spring 52. As catch 46 rotates, fastener 718 slides downward in slot 722 of link 710 without causing movement of link 710. Once the end 727 of catch 46 registers with the opening in receiver 50 as receiver 50 moves closer to catch 46 (or vice versa), catch 46 rotates in the counterclockwise direction (as viewed in FIG. 7) under the bias of spring 52 and the end 727 of catch 46 ultimately springs into receiver 50. At this point, tongue 34 is retained in the transport configuration (FIG. 1) by receiver 50.

While the mower is maintained in the transport configuration, the field wheel hydraulics are held in a raised position by the tractor hydraulics, and, it is conceivable that one of those hydraulic systems could suffer from an internal valve leakage that would either cause or allow the wheel 24 to inadvertently move downwardly. If fastener 718 were pinned to link 710, as opposed to being positioned in slot 722 like that shown in FIGS. 7 and 9, then the downwardly moving wheel could inadvertently and immediately cause the link 710 to move downwardly, which would result in immediate rotation of catch 46 in the clockwise direction (as viewed in FIG. 7) and release of the tongue 34 from the trail frame 20. However, by virtue of slot 722, if wheel 24 inadvertently moves downwardly, then link 710 will also move downwardly, but the slot 722 will travel over fastener 718 without causing rotation (and release) of catch 46. Stated differently, slot 722 has a length dimension that is sized to accommodate inadvertent translation of wheel 24 in the downward direction during transport without resulting in release of catch 46 from receiver 50. Slot 722 is also sized to accommodate movement of tongue 34 to the transport position while catch 46 is maintained in the latched position shown in FIG. 7 without causing movement of link 710 or wheel 24, as was described in the paragraph above.

The vertical distance shown in FIG. 7 between the top end of slot 722 and fastener 718 defines the lost travel motion of the latch mechanism 744. By virtue of that lost travel motion, the wheel 24 can inadvertently translate downward while in the transport position, without causing tongue 34 to release from receiver 50. It is only after wheel 24 has inadvertently translated by more than about 50% of its total travel (i.e., travel from the stowed to the deployed positions), that the link 710, which is connected to wheel 24, will rotate catch 46 to the unlatched position.

Link 710 may be referred to herein as "one-way" because it is capable of moving catch 46 to the unlatched state, however, link 710 is not capable of moving catch 46 to the latched state due to the existence of slot 722.

While this disclosure has been described with respect to at least one embodiment, the subject disclosure can be further modified within the spirit and scope of this disclosure. This application is therefore intended to cover any variations, uses, or adaptations of the disclosure using its general principles. Further, this application is intended to cover such departures from the subject disclosure as come within known or customary practice in the art to which this disclosure pertains and which fall within the limits of the appended claims.

What is claimed is:

1. An agricultural machine, comprising:
   a trail frame;
   a wheel arm pivotably attached to said trail frame;
   a field wheel mounted on said wheel arm;
   a tongue pivotably mounted on said trail frame, said trail frame being pivotal relative to said tongue, or vice versa, between a field position and a transport position; and
   a latch mechanism for releasably securing said trail frame to said tongue, said latch mechanism comprising:
   (i) a catch mounted on said trail frame for pivoting motion about a fulcrum;
   (ii) a receiver mounted on said tongue, said catch being engageable with said receiver;
   (iii) a spring acting between said catch and said trail frame on a first side of said fulcrum for biasing said catch into engagement with said receiver; and
   (iv) a rigid link acting between said wheel arm and said catch on a second side of said fulcrum opposite to said first side; wherein:
   pivoting motion of said wheel arm moving said field wheel away from said trail frame causes movement of said rigid link, and, once a pre-defined lost travel motion is overcome, continued movement of said rigid link causes pivoting of said catch about said fulcrum and disengagement of said catch from said receiver.

2. The agricultural machine according to claim 1, wherein said rigid link includes an elongated slot in which a pin of the catch is positioned.

3. The agricultural machine according to claim 2, wherein, during said pre-defined lost travel motion, said elongated slot moves over said pin without moving said pin until the pin reaches an end of the elongated slot.

4. The agricultural machine according to claim 1, further comprising an actuator acting between said trail frame and said wheel arm for effecting pivoting motion of said wheel arm relatively to said trail frame.

5. The agricultural machine according to claim 4, wherein said actuator comprises a hydraulic actuator.

6. The agricultural machine according to claim 4, wherein a piston of the actuator is mounted to a top side of the wheel arm, and the rigid link is mounted to a side surface of the wheel arm.

7. The agricultural machine according to claim 1, wherein said rigid link includes a first end including an elongated slot in which a pin of the catch is positioned and a second end, opposite the first end, that is pinned or fastened to the wheel arm.

8. The agricultural machine according to claim 1, wherein said rigid link is formed from bent sheet metal.

9. The agricultural machine according to claim 1, wherein one end of said wheel arm is pivotably coupled to the trail frame, an opposite end of said wheel arm is fixed to the field wheel, and the rigid link is mounted to the wheel arm at a location between said ends.

10. The agricultural machine according to claim 1, wherein said pre-defined lost travel motion comprises at least 50% of a full range of motion of said link.

11. The agricultural machine according to claim 1, wherein said rigid link is slideably mounted to the catch for a portion of a full range of motion of said link.

12. The agricultural machine according to claim 1, wherein one end of said catch is mounted to said spring, an opposite end of said catch is mounted to said rigid link, and the trail frame is mounted to the catch at a location between said ends.

13. The agricultural machine according to claim 1, further comprising a header mounted on said trail frame, said header comprising a plurality of crop cutting blades.

14. The agricultural machine according to claim 1, wherein said rigid link includes an elongated slot in which a pin of the catch is positioned, and, in a retracted transport position of the field wheel, the pin is spaced apart from each of two opposing ends of the elongated slot, such that movement of wheel during said lost travel motion of said rigid link, does not immediately cause disengagement of said catch from said receiver.

15. The agricultural machine according to claim 1, wherein the agricultural machine is a mower.

\* \* \* \* \*